INVENTOR.
DOMER SCARAMUCCI
BY
Dunlap and Laney
ATTORNEYS

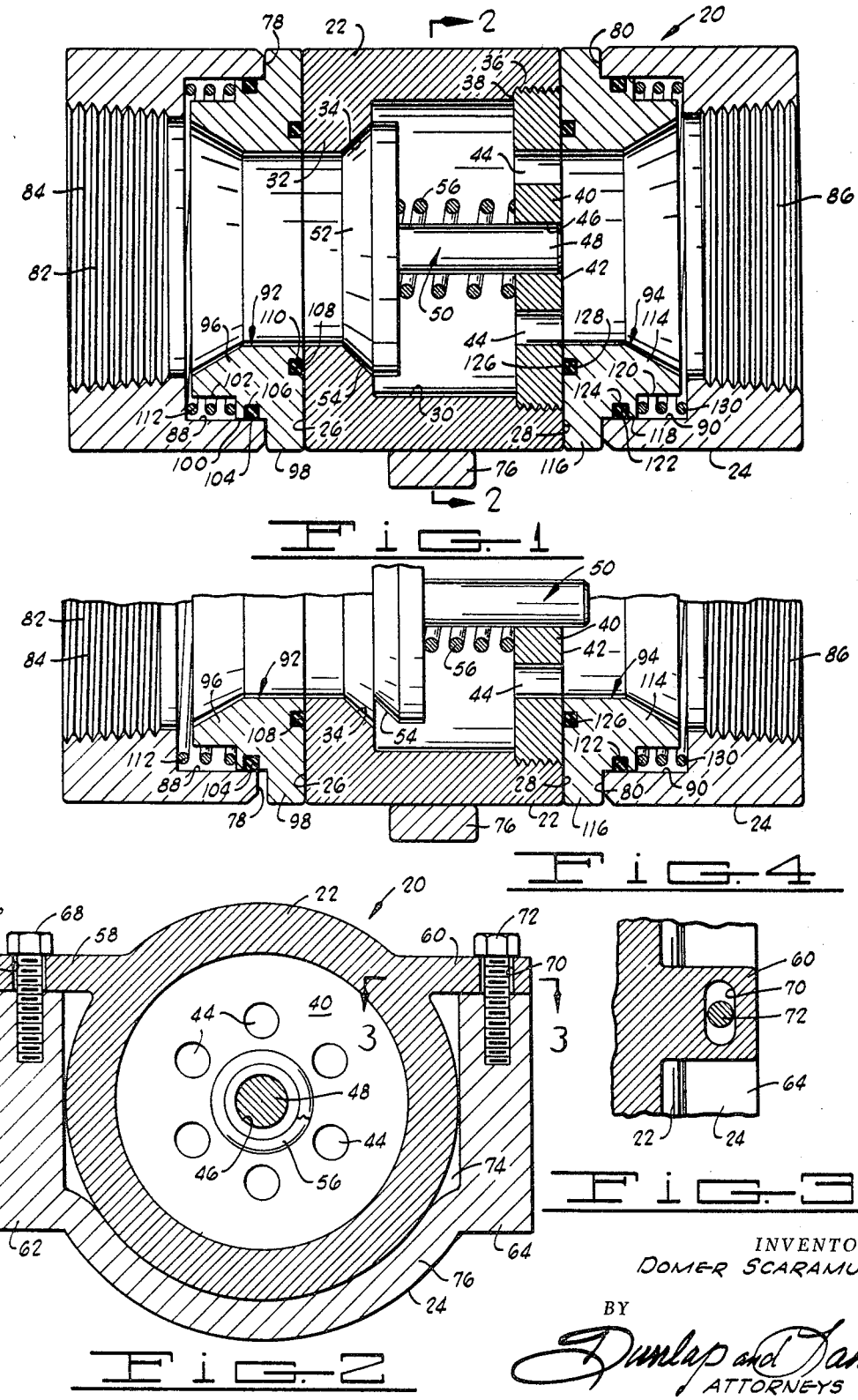

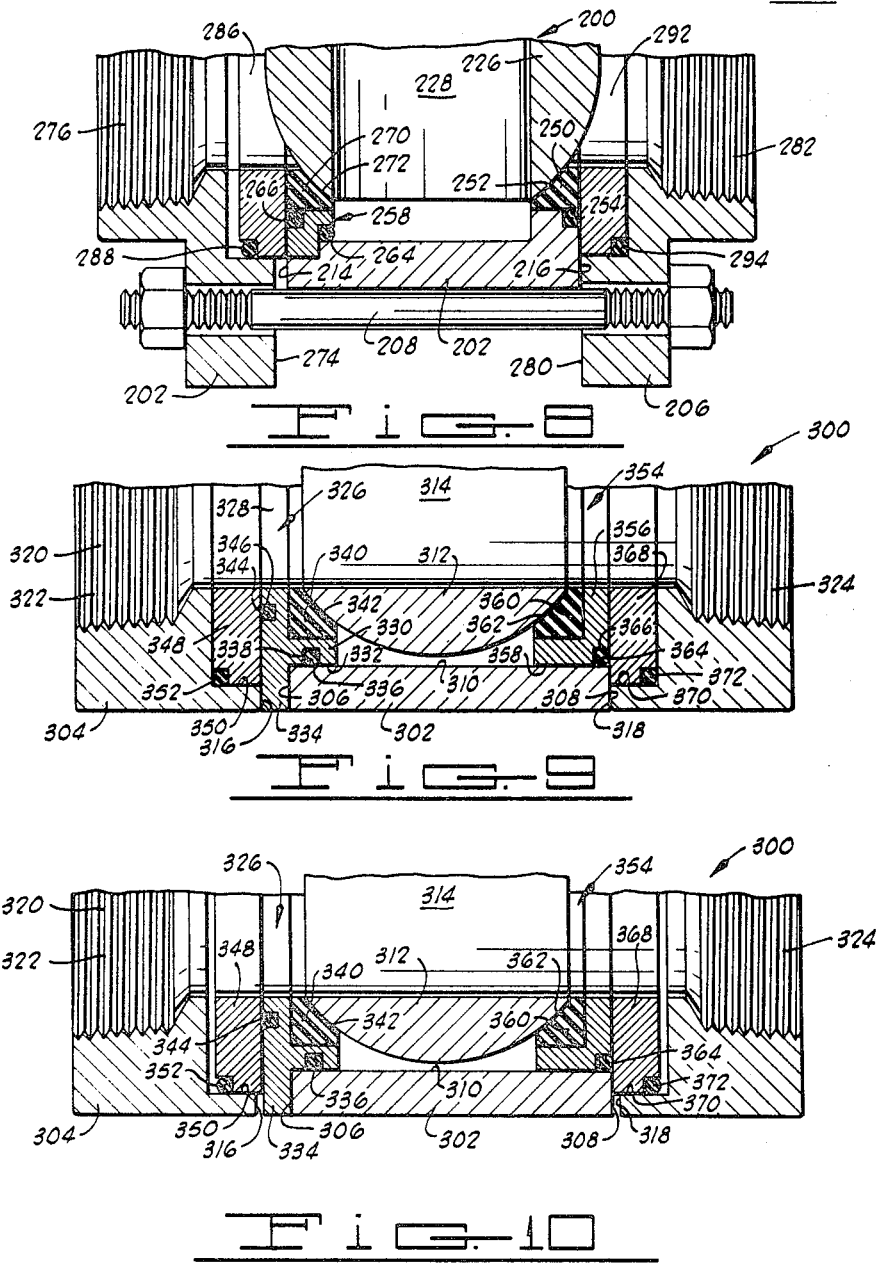

United States Patent Office 3,434,495
Patented Mar. 25, 1969

3,434,495
FLOW CONTROL APPARATUS HAVING DIFFERENTIAL AREA BODY SEALS
Domer Scaramucci, 3245 S. Hattie,
Oklahoma City, Okla. 73129
Filed Apr. 4, 1966, Ser. No. 539,705
Int. Cl. F16k *5/02, 15/00, 27/00*
U.S. Cl. 137—542
16 Claims

ABSTRACT OF THE DISCLOSURE

To provide improved flow control apparatus, wherein the seal means is so disposed with respect to the body means and the connection means as to create a differential pressure, which contributes to hold the seal means in sealing engagement with the body means, thus providing a fluid tight seal in the event that the valve is elongated as a result of fluid pressure.

---

This invention relates generally to improved flow control apparatus. More particularly, but not by way of limitation, this invention relates to improved flow control apparatus including differential area body seals.

Many valves and flow control devices constructed in the past have included a body arranged to be disposed in a housing permanently located in the fluid circuit or between flanged connection members that are permanently connected in the fluid circuit. The primary advantage gained by such an arrangement is that the body, which contains the flow control portions subjected to wear, is relatively easily removed and replaced while the valve housing or flanged connection members remain connected in the fluid circuit. However, it has been found that such valves or flow control devices frequently leak between the body and the housing or between the body and the flanged connection members due to the elongation of the housing or due to the separation of the flanged connection members as a result of elongation of the threaded fasteners joining the connection members.

Th elongation of the housing generally occurs as a result of fluid pressure in the circuit reaching a sufficiently high magnitude to strain the housing in the relatively thin wall or side portions thereof. The construction utilizing the flanged connection members may develop leaks between the body and the connection members when the fluid pressure in the circuit reaches a sufficiently high value to elongate the threaded fasteners joining the connection members and holding the body assembled therewith.

The usual attempt made to overcome the leakage problem has been to increase the thickness of the valve housing or to increase the diameter of the threaded fasteners joining the connection members. Manifestly, increasing the thickness of the valve housing increases its weight and increases the cost of the device. Also, increasing the diameter of the threaded fasteners requires large flanged connection members which also increases the weight and cost of such devices.

This invention provides improved flow control apparatus including: connection means having an opening extending therethrough and a pair of opposed surfaces on the connection means; body means disposed in the connection means and having a pair of end faces, each end face facing a respective one of the opposed surfaces on the connection means; and, annular seal means slidingly disposed in the connection means adjacent at least one end face on the body means, the seal means sealingly engaging the connection means and sealingly engaging the body means along a circumference having a diameter smaller than the diameter of sealing engagement with the connection means, whereby fluid pressure in the apparatus holds the seal means in sealing engagement with the body means.

One object of the invention is to provide improved flow control apparatus that effectively eliminates leakage from the apparatus in the event that the connection means elongates.

Another object of the invention is to provide an improved flow control apparatus that includes differential area seals carried by the connection means that are arranged to respond to fluid pressure in the apparatus to maintain a fluid-tight seal with the control apparatus body even though elongation of the connection means occurs.

Another object of the invention is to provide an improved valve having a valve body disposed between flanged connection members that includes seal means responsive to fluid pressure in the circuit to maintain an effective fluid-tight seal between the connection means and the valve body.

A further object of the invention is to provide an improved valve for use in a valve housing that includes seal means responsive to fluid pressure in the circuit to maintain an effective fluid-tight seal between the valve housing and the valve body even though elongation of the housing occurs.

Another object of the invention is to provide improved flow control apparatus that can be easily and economically constructed.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a check valve constructed in accordance with the invention;

FIG. 2 is a transverse cross-sectional view taken generally along the line 2—2 of FIG. 1;

FIG. 3 is a fragmentary, horizontal cross-sectional view taken generally along the line 3—3 of FIG. 2;

FIG. 4 is a fragmentary cross-sectional view of the lower half of FIG. 1, but showing the various components thereof wherein the valve housing has elongated and showing the valve member in the open position;

FIG. 8 is a cross-sectional view similar to FIG. 7, but illustrating the position of the various components when the valve member is in the closed position;

FIG. 9 is a fragmentary, vertical cross-sectional view illustrating another embodiment of ball valve also constructed in accordance with the invention; and, FIG. 10 is a cross-sectional view similar to FIG. 9, but illustrating the position to the various components when the valve housing has elongated.

Embodiment of FIG. 1

Figure 5:
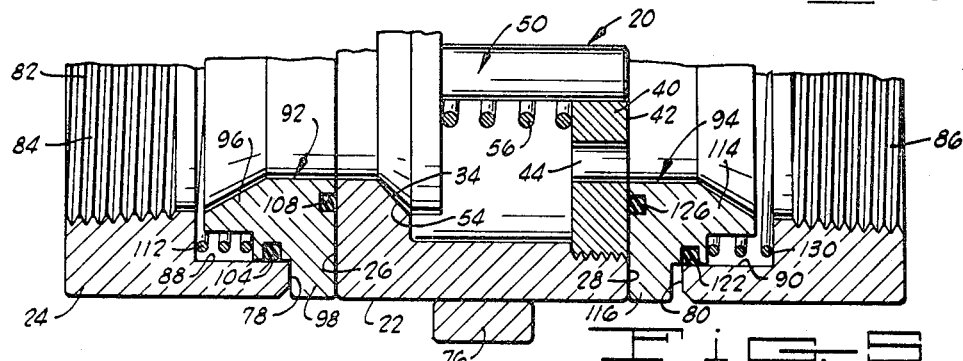
FIG. 5 is similar to FIG. 4 but illustrating the valve member in the closed position.

Referring to the drawing and to FIG. 1 in particular, shown therein and generally designated by the reference character 20 is a check valve constructed in accordance with the invention. As illustrated therein, the check valve 20 includes a valve body 22 disposed in a valve housing 24.

The valve body 22 includes an upstream end face 26, a downstream end face 28 and a bore 30 extending therethrough and intersecting end faces 26 and 28. An inwardly extending flange portion 32 of the valve body 22 has a beveled seating surface 34 formed thereon for purposes that will appear more fully hereinafter.

A threaded counterbore 36 in the valve body 22 adjacent the downstream end 28 thereon forms a shoulder 38 therein. The counterbore 36 is arranged to receive a perforated spider member 40 that is disposed in the counterbore 36 in engagement with the shoulder 38. It will be noted that a surface 42 on the spider member 40 forms an extension of the downstream end face 28 of the valve body 22.

The spider member 40 (also see FIG. 2) includes a plurality of perforations 44 that extend therethrough to permit flow through the valve body 22 as will be described. A centrally located aperture 46 in the spider member 40 slidingly receives a stem portion 48 of a valve member generally designated by the reference character 50.

In addition to the stem portion 48, the valve member 50 also includes a head portion 52 having a beveled surface 54 thereon that is arranged to sealingly engage the seating surface 34 in the valve body 22.

A compressing spring 56 encircles the stem portion 48 of the valve member 50 and has one end in engagement with the spider member 40 and the other end in engagement with the head portion 52 of the valve member 50. The spring 56 is arranged to bias the surface 54 on the head portion 42 into sealing engagement with the seating surface 34 of the valve body 22.

As may be seen in FIG. 2, the valve body 22 also includes a pair of tab portions 58 and 60 that project outwardly therefrom into overlying relationship with a pair of elongated side portions 62 and 64 on the valve housing 24. The tab portion 58 includes a slot 66 that extends therethrough and is sized to receive a threaded fastener 68. The fastener 68 extends through the slot 66 into threaded engagement with the side portion 62.

The tab portion 60 includes a slot 70 that extends therethrough and is sized to receive a threaded fastener 72. The threaded fastener 72 extends through the slot 70 into threaded engagement with the side portion 64. The relationship of the tab portion 60, the threaded fastener 72 and the elongated side portion 64 is more clearly illustrated in FIG. 3.

In the preferred form of the invention, it is desirable to have the body 22 movable with respect to the housing 24 for purposes that will appear more fully hereinafter. The slots 66 and 10 are enlarged or slightly elongated relative to the size of the fasteners 68 and 72 so that the body 22 can move relative to the threaded fasteners 68 and 72.

The elongated side portions 62 and 64 define sides of a cavity 74 formed in the valve housing 24. The cavity 74 is sized to receive the valve body 22.

As is clearly shown in FIG. 2, a strap 76 extends between the side portions 62 and 64. The strap 76 is arcuate in configuration to aid in supporting the valve body 22 therein.

As may be seen more clearly in FIG. 1, the ends of the cavity 74 are defined by opposed surfaces 78 and 80 on the valve housing 24. An opening 82 extends through the valve housing 24 intersecting the cavity 74.

An upstream end 84 of the opening 82 is partially threaded to receive one end of a section of conduit (not shown). Similarly, a downstream end 86 of the opening 82 is also partially threaded to receive one end of a section of conduit (not shown).

A counterbore 88 is formed in the valve housing 24 adjacent the opposed surface 78. A counterbore 90 is formed in the valve housing 24 adjacent the opposed surface 80. The counterbores 88 and 90 are sized to receive identically constructed seal assemblies that are generally designated by the reference characters 92 and 94, respectively.

The seal assembly 92 includes a relatively rigid body portion 96 having a flange portion 98 disposed between the surface 78 on the housing 24 and the face 26 on the valve body 22, an outer periphery 100 slidingly disposed in the counterbore 88, and an annular recess 102 adjacent the end thereof that is disposed in the counterbore 88.

An O-ring seal 104 is located in an annular groove 106 formed in the seal body 96 adjacent the outer periphery 100 thereof. The O-ring seal 104 is in sliding and sealing engagement with the valve housing 24 in the counterbore 88.

An O-ring seal 108 is disposed in an annular groove 110 formed in the seal body 96 adjacent the end face 26 on the valve body 22. The O-ring seal 108 is in sealing engagement with the end face 26 of the valve body 22.

A compression spring 112 encircles the seal body 96 in the annular recess 102. The spring 112 has one end in engagement with the valve housing 24 and the other end in engagement with the seal body 96, thereby biasing the seal assembly 92 toward the end face 26 of the valve body 22. The spring 112 functions to initiate the sealing engagement between the O-ring seal 108 carried by the seal body 96 and the end face 26 of the valve body 22.

The seal assembly 94 includes a relatively rigid seal body 114 having a flange portion 116 disposed between the end face 28 on the valve body 22 and the surface 80 on the valve housing 24, an outer periphery 118 slidingly disposed in the counterbore 90 in the valve housing 24, and an annular recess 120 encircling the seal body 114 adjacent the end thereof disposed in the counterbore 90.

An O-ring seal 122 is disposed in an annular groove 124 formed in the seal body 114 adjacent the periphery 118 thereof. The seal 122 is in sliding and sealing engagement with the valve housing 24 in the counterbore 90.

An O-ring seal 126 is disposed in an annular groove 128 formed in the seal body 114 adjacent the surface 42 on the spider member 40. The O-ring seal 126 is in sealing engagement with the surface 42.

A compression spring 130 encircles the seal body 114 in the recess 120. The spring 130 has one end in engagement with the seal body 114 and the other end in engagement with the valve housing 24. The spring 130 functions to bias the valve body 114 toward the end face 28 on the valve body 22, thereby maintaining the O-ring seal 126 in sealing engagement with the surface 42 of the spider member 40.

As clearly shown in FIG. 1, the O-ring seals 104 and 122 are larger in diameter than the O-ring seals 108 and 126, respectively, thereby defining differential areas on each of the seal assemblies 92 and 94 that are subject to the force generated by fluid pressure in the opening 82 of the valve housing 24. As a result of the differential areas of the seal assemblies 92 and 94, the fluid pressure in the opening 82 biases the seal assemblies 92 and 94 relatively toward the valve body 22, maintaining the O-ring seal 108 in engagement with the end face 26 and maintaining the O-ring seal 128 in sealing engagement with the surface 42 of the spider member 40.

*Operation of the embodiment of FIG. 1*

FIG. 1 illustrates the valve 20 in the closed position, that is, with the surface 54 on the valve member 50 in engagement with the seating surface 34 on the valve body 22. This will be in the position of the various components of the valve 20 when there is no pressure in the valve or the pressure in the downstream end 86 of the opening 82 is greater than the pressure in the upstream end 84 thereof.

As previously mentioned, the springs 112 and 130 bias the seal assemblies 92 and 94 into sealing engagement with the valve body 22. Of course, if there is pressure in the downstream end 86 of the valve 20, such pressure augments the force of the spring 130 to bias the seal assembly 94 more tightly into engagement with the valve body 22. In either event, fluid is prevented from escaping from the valve 20 due to the sealing engagement of the O-rings 108 and 126 with the valve body 22 and due to the sealing engagement between the O-ring seals 104 and 122 with the valve housing 24.

The fragmentary cross-sectional view of FIG. 4 illustrates the valve member in the open position, that is, with the surface 54 thereon separated from the seating surface 34 on the valve body 22, thereby permitting flow through the opening 82 in the valve housing 24 and through the valve body 22. As illustrated therein, the fluid pressure in the valve 20 has become sufficiently high to elongate the valve housing 24.

When the valve housing 24 elongates the opposed surfaces 78 and 80 thereon are moved relatively apart. Due to the force exerted on the valve body 22 as the fluid flows therethrough, the valve body 22 moves relatively downstream carrying the seal assembly 94 therewith and holding the flange portion 116 thereon in engagement with the surface 80 of the valve housing 24.

As the valve body 22 moves downstream, the upstream seal assembly 92 moves therewith under the influence of the spring 112 and the fluid pressure in the upstream end 84 of the opening 82. As previously mentioned, the seals 104 and 108 on the upstream seal assembly 92 define a differential area thereon which is subject to fluid pressure in the valve 20 so that the fluid pressure maintains the O-ring seal 108 in sealing engagement with the end face 26 of the valve body 22.

Thus, and even though the opposed surfaces 78 and 80 are spread, no fluid can escape from the valve 20 between the valve body 22 and the seal assemblies 92 and 94 due to the sealing engagement of the O-ring seals 108 and 126, respectively, with the valve body 22. Also, no fluid can escape from the valve 20 between the seal assemblies 92 and 94 and the housing 24 due to the sealing engagement of the O-ring seals 104 and 122 with the valve housing 24 in the counterbores 88 and 90, respectively.

The fragmentary cross-sectional view of FIG. 5 shows the valve member 50 in the closed position, that is, in the position wherein the surface 54 thereon is in sealing engagement with the seating surface 34 on the valve body 22. The valve housing 24 is elongated as described in connection with FIG. 4.

Fluid pressure in the downstream end 86 of the opening 82 is greater than the fluid pressure in the upstream end 84 thereof, maintaining the valve member 50 in the closed position and shifting the valve body 22 relatively upstream. The upstream movement of the valve body 22 carries the upstream seal assembly 92 therewith and such movement continues until the flange portion 98 on the upstream seal assembly 92 engages the surface 78 on the valve housing 24.

The downstream seal assembly 94 follows the movement of the valve body 22 due to the force exerted thereon by the spring 130 and due to the effect of fluid pressure in downstream end 86 in the opening 82 exerting a force on the differential area of the seal assembly 94 as defined by the O-ring seals 122 and 126. Thus, no fluid can escape from the valve 20 between the valve body 22 and the seal assemblies 92 and 94 due to the sealing engagement between the O-ring seals 108 and 126 with the end faces 26 and 28 on the valve body 22, respectively. Also, no fluid can escape from the valve 20 between the seal assemblies 92 and 94 and the valve housing 24 due to the sealing engagement of the O-ring seals 104 with the valve housing 24 in the counterbore 88 and due to the sealing engagement between the O-ring seal 122 with the valve housing 24 in the counterbore 90.

From the foregoing, it can be appreciated that the valve 20 constructed as described, is effective to prevent the escape of fluid therefrom regardless of the position of the valve member 50 and regardless of whether or not elongation of the valve housing 24 has occurred.

Figure 6:
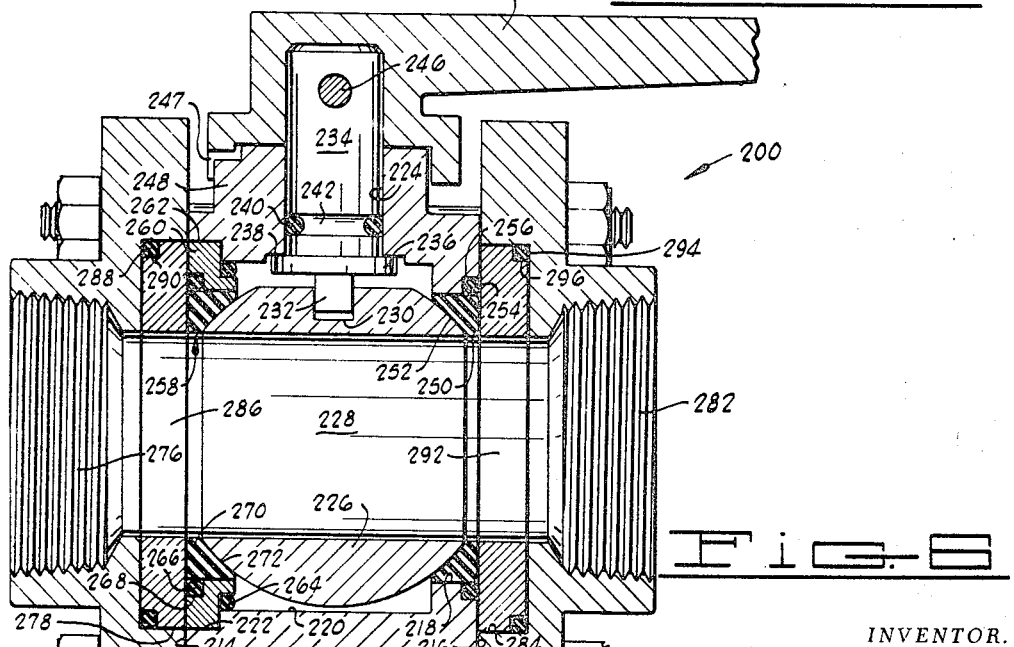
FIG. 6 is a vertical cross-sectional view of a ball valve also constructed in accordance with the invention.

*Embodiment of FIG. 6*

The cross-sectional view of FIG. 6 illustrates a ball valve generally designated by the reference character 200 and also constructed in accordance with the invention. As shown therein, the ball valve 200 includes a valve body 202 disposed between a flanged upstream connection member 204 and a flanged downstream connection member 206.

The valve body 202 and connection members 204 and 206 are held in assembled relation by a plurality of threaded fasteners 208 that extend through the connection members 204 and 206. The threaded fasteners 208 are each provided with a threaded nut 210 that is in engagement with the flanged upstream connection member 204 and a threaded nut 212 that is in engagement with the downstream flanged connection member 206.

The valve body 202 includes an upstream end face 214, a downstream end face 216, and a bore 218 that extends therethrough intersecting the end faces 214 and 216. A counterbore 220 extends into the valve body 202 from the upstream end face 214. A second and larger counterbore 22 extends into the valve body 202 from the upstream end face 214 and an opening 224 extends transversely through the valve body 202 intersecting the counterbore 220.

A valve member 226, which is illustrated as being spherical in configuration, is disposed in the counterbore 220 and has a flow port 228 extending therethrough. The exterior of the valve member 226 is provided with a rectangular recess 230 that is sized to receive a rectangular lower end 232 on a valve operating member 234.

As clearly illustrated in FIG. 6, the valve operating member 234 extends through the opening 224 in the valve body 202 and includes an exterior flange 236 that is in engagement with a downwardly facing surface 238 in the valve body 202 to limit the upward movement of the valve operating member 234 relative to the valve body 202. An O-ring seal 240 is disposed in an annular groove 242 formed in the valve operating member 234. The O-ring seal 240 form fluid-tight seal between the valve operating member 234 and the valve body 202 in the opening 224.

The upper end of the valve operating member 234 is connected with an operating handle 244 by a pin 246. The handle 244 includes one or more lug portions 247 that are engageable with abutments 248 (only one is shown in FIG. 6) to limit the rotational movement of the handle 244 and the interconnected valve member 226 to approximately 90°.

An annular seal member 250 encircles the bore 218 in the valve body 202 and is preferably bonded thereto. The annular seal member 250 has a surface 252 thereon that is arranged to sealingly engage the exterior surface of the valve member 226. An O-ring seal 254 is disposed in an annular recess 256 formed in the end face 216 of the valve body 202.

A seal assembly, designated by the reference character 258, is disposed in the valve body 202 adjacent the end face 214 thereof. The seal assembly 258 includes a relatively rigid seal body 260 that has an outer periphery 262 disposed in the counterbore 222 in the valve body 202.

The seal body 260 carries an annular seal 264 that is in sealing engagement with the valve body 202 in the counterbore 220. An O-ring seal 266 is disposed in an annular recess 268 formed in the seal body 260 for purposes that will appear more fully hereinafter.

An annular seal member 270 is preferably bonded to the inner periphery of the seal body 260. The seal member 270 has the surface 272 thereon that is arranged to sealingly engage the exterior surface of the valve member 226. It should be pointed out that the valve body 202 is constructed of such length that the seal members 250 and 270 sealingly engage the exterior surface of the valve member 226 upon assembly of the valve 200, thereby initiating a fluid-tight seal with the valve member 226 and holding the vlave member 226 centered in the valve body 202 as illustrated in FIG. 6.

The upstream flanged connection member 204 includes an end face or surface 274 that faces the end face 214 of the valve body 202. A partially threaded opening 276 extends through the connection member 204 intersecting the surface 274 and a counterbore 278 that is equal in diameter to the counterbore 222 in the valve body 202 is formed in the surface 274 of the connection member 204.

The flanged downstream connection member 206 includes an end face or surface 280 that faces the end face 216 on the valve body 202. A partially threaded opening 282 extends through the flanged connection member 206 intersecting the surface 280 and a counterbore 284 is formed therein adjacent the surface 280. The counterbore 284 should be at least as large in diameter as the counterbore 278 in the upstream flanged connection member 204.

An annular body seal 286 is slidingly disposed in the counterbore 278 formed in the flanged connection member 204. The body seal 286 includes an O-ring seal 288 that is disposed in an annular recess 290 formed in the body seal 286. As clearly shown in FIG. 6, the O-ring seal 288 is in sliding and sealing engagement with the flanged connection member 204 in the counterbore 278. The O-ring seal 288 is larger in diameter than the O-ring seal 266 carried by the seal assembly 258 and therefore defines a differential area on the body seal 286 that is responsive to fluid pressure in the valve 200 whereby the body seal 286 is biased toward the valve body 202.

An annular body seal 292 is slidingly disposed in the counterbore 284 of the flanged downstream connection member 206. An O-ring seal 294 is disposed in an annular recess 296 in the body seal 292. The O-ring seal 294 is in sliding and sealing engagement with the flanged connection member 206 in the counterbore 284. As clearly shown in FIG. 6, the O-ring seal 294 has a larger diameter than the O-ring seal 254 carried by the valve body 202 defining a differential area on the body seal 292 whereby the body seal 292 is biased by fluid pressure in the valve 200 relatively toward the valve body 202.

*Operation of the embodiment of FIG. 6*

With the valve member 226 in the open position, that is, in the position wherein the flow port 228 therein is aligned with the openings 276 and 282 in the connection members 204 and 206, respectively, fluid flows through the valve 200. The various components of the valve 200 remain as illustrated in FIG. 6 until the pressure therein increases to a sufficiently high magnitude to force the flanged connection members 204 and 206 relatively apart, that is, into the position illustrated in FIG. 7.

As shown therein, the surfaces 274 and 280 on the connection members 204 and 206, respectively, have moved relatively apart elongating the threaded fasteners 208. It will be noted therein, that the end faces 214 and 216 on the valve body 202 are separated from the surfaces 274 and 280 on the flanged connection members 204 and 206, respectively. It should be pointed out, that with the usual valve construction, leakage would occur between the valve body and the flanged connection members when the fasteners elongate.

However, in the valve 200, fluid pressure therein exerts a force on the differential area of the body seals 286 and 292 moving them relatively toward the valve body 202. Fluid cannot leak from the valve 200 between the seal assembly 258 and the body seal 286 due to the sealing engagement of the O-ring seal 266 with the body seal 286. Similarly, fluid cannot leak from the valve 200 between the valve body 202 and the body seal 292 due to the sealing engagement between the O-ring seal 254 and the body seal 292.

The O-ring seals 288 and 294 carried by the body seals 286 and 292, respectively, prevent the escape of fluid from the valve 200 between the flanged connection members 204 and 206 and the body seals 286 and 292. As can be appreciated from viewing FIG. 7, fluid cannot escape from the valve 200 between the valve body 202 and the seal assembly 258 due to the sealing engagement of the seal 264 with the valve body 202 in the counterbore 220.

With the valve member 226 rotated to the closed position, that is, to the position wherein the flow port 228 therein is disposed at 90° relative to the openings 276 and 282, the various components of the valve 200 assume the position illustrated in FIG. 8. As shown therein, fluid pressure in the opening 276 of the flanged connection member 204 exerts a force on the valve member 226 moving it relatively downstream and, due to its engagement with the surface 252 on the seal member 250, carrying the valve body 202 and the body seal 292 downstream therewith.

The downstream movement of the valve member 226 and the valve body 202 continues until the end face 216 on the valve body 202 engages the surface 280 on the flanged connection member 206. As can be appreciated, the engagement of the valve member 226 with the annular seal 250 forms a fluid-tight downstream seal in the valve 200 providing for the complete closure thereof.

Simultaneously, fluid pressure in the opening 276 exerts a force on the differential area of the body seal 286, moving the body seal 286 relatively downstream and maintaining its sealing engagement with the O-ring seal 266 in the seal assembly 258. As can also be appreciated from viewing FIG. 8, the O-ring seal 288 carried by the body seal 286 maintains its sealing engagement with the flanged connection member 204. Thus, no fluid can escape from the valve 200 even though the fasteners 208 have elongated as illustrated in FIG. 8.

Figure 7:
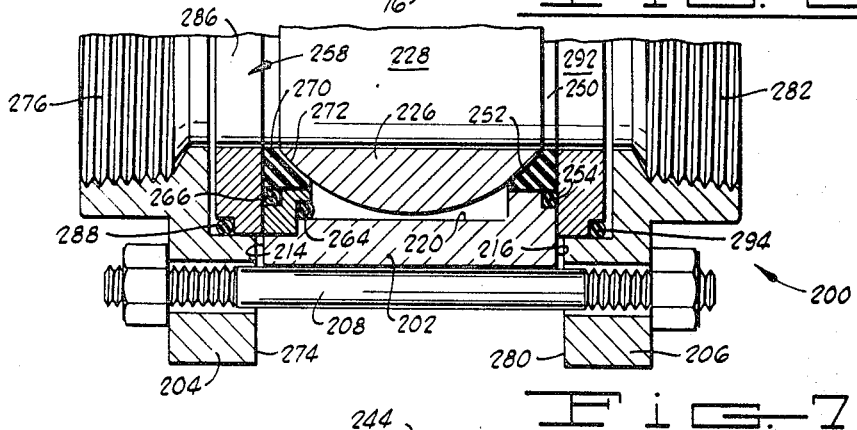
FIG. 7 is a fragmentary cross-sectional view of the lower half of FIG. 6, but illustrating the various components therein when the flanged connection members have separated.

As can be appreciated from viewing FIGS. 6, 7 and 8, the construction described hereinafter is effective to prevent escape of fluid from the valve 200 whether the valve member 226 is in the open or closed position and regardless of whether separation of the flanged connection members 204 and 206 has occurred. Also, it should be pointed out that even if such separation has occurred a complete shut-off of the valve 200 is attained when the valve member 226 is in the closed position as shown in FIG. 8.

*Embodiment of FIG. 9*

The fragmentary cross-sectional view of FIG. 9 illustrates a ball valve constructed in accordance with the invention and generally designated by the reference character 300. It can be seen, by comparing FIG. 9 with FIGS. 1 and 6 that the valve 300 is a combination of the features illustrated in FIGS. 1 and 6. It will be understood that the valve 300 includes the necessary operating components previously described in connection with FIG. 6.

The valve 300 includes a valve body 302 disposed in a valve housing 304. It will also be understood that the valve body 302 is preferably retained in the valve housing 304 as previously described in connection with the embodiment of FIG. 1.

The valve body 302 includes an upstream end face 306, a downstream end face 308, and a bore 310 extending therethrough and intersecting the end faces 306 and 308. A valve member 312, which is illustrated as being spherical in configuration, is disposed in the bore 310 and has a flow port 314 extending therethrough.

The valve housing 304 includes a surface 316 facing the end face 306 of the valve body 302, a surface 318 facing the end face 308 of the valve body 302, and an opening 320 extending therethrough and intersecting the surfaces 316 and 318. The opening 320 includes a partially threaded upstream end 322 and a partially threaded downstream end 324.

An upstream seal assembly 326 is disposed in the valve 300 and includes a relatively rigid seal body 328. The seal body 328 includes an axial flange portion 330 having an outer periphery 332 sized to fit within the bore 310 of the valve body 302. A radial flange portion 334 on the seal body 328 extends between the end face 306 of the valve body 302 and the surface 316 on the valve housing 304.

An O-ring seal 336 is disposed in an annular groove 338 formed in the periphery 332 of the seal body 328. The O-ring seal 36 is in sealing engagement with the valve body 302 in the bore 310.

The seal assembly 326 also includes an annular seal member 340 having a surface 342 thereon arranged to sealingly engage the exterior surface of the valve member 312. An O-ring seal 344 is disposed in an annular groove 346 formed in the seal body 328 adjacent an annular body seal 348.

The annular body seal 348 is slidingly disposed in a counterbore 350 formed in the valve housing 304 adjacent the surface 316 thereon. An annular seal 352 is carried by the body seal 348 in sliding and sealing engagement with the valve housing 304 in the counterbore 350. It will be noted that the seal 352 has a diameter larger than the seal 344, thereby defining a differential area on the body seal 348 that is subject to the fluid pressure in the valve 300.

A downstream seal assembly 354 includes a relatively rigid seal body 356 having an outer periphery 358 disposed in the bore 310 of the valve body 302. The seal assembly 354 also includes an annular seal member 360 having a surface 362 thereon arranged to sealingly engage the exterior surface of the valve member 312.

An annular seal 364 is disposed in an annular recess 366 formed in the seal body 356. The seal 364 is in sealing engagement with the valve body 302 in the bore 310. The seal 364 also sealingly engages a body seal 368 that is slidingly disposed in a counterbore 370 formed in the valve housing 306 adjacent the surface 318 thereon.

An annular seal 372 carried by the seal body 368 is in sliding and sealing engagement with the valve housing 304 in the counterbore 370. It will be noted that the diameter of the seal 372 is greater than the diameter of the seal 364, thereby defining a differential area on the body seal 368 that is subject to the fluid pressure in the valve 300.

*Operation of the embodiment of FIG. 9*

When in the open position, the various components of the valve 300 remain in the position illustrated in FIG. 9 until the fluid pressure therein increases to a sufficient magnitude to elongate the valve housing 304 as previously described in connecion with the valve housing 24 of FIG. 1. When elongation of the housing 304 occurs, the surfaces 316 and 318 thereon move relatively apart to the position illustrated in FIG. 10.

As shown therein, fluid pressure in the opening 320 in the valve housing 304 exerts a force on the body seals 348 and 368, moving them relatively toward the valve body 302. Assuming that the valve body 302 remains relatively centered with respect to the valve housing 304, it can be seen that the flange portion 334 on the upstream seal assembly 326 is separated from the surface 316 of the valve housing 304 and the end face 308 on the valve body 302 is separated slightly from the surface 318 on the valve housing 304. No fluid can escape from the valve 300 between the body seals 348 and 368 and the valve housing 304 due to the sealing engagement of the seals 352 and 372 with the valve housing 304 in the counterbore 350 and 370, respectively.

No fluid can escape from the valve 300 between the body seal 348 and the seal assembly 326 due to the sealing engagement between the O-ring seal 344 and the body seal 348. Similarly, no fluid can escape from the valve 300 between the seal assembly 354 and the body seal 368 due to the sealing engagement of the seal 364 with the body seal 368.

Fluid is prevented from escaping the valve 300 between the seal assemblies 326 and 354 and the valve body 302 due to the sealing engagement of the O-ring seals 336 and the seal 364 with the valve body 302 in the bore 310. Thus, and as can be appreciated from viewing FIGS. 9 and 10, the seal arrangement described is effective to avoid leakage from the valve 300 in the event that the valve housing 304 elongates spreading the surfaces 316 and 318 thereon.

Although not illustrated, it will be understood that when the valve member 312 is rotated to the closed position, that is, to the position wherein the flow port 314 is disposed at a right angle relative to the opening 320 extending through the valve housing 304, a fluid-tight seal will be formed between the valve member 312 and the surface 362 on the annular seal member 360. The force generated by fluid pressure in the upstream end 322 of the opening 320 moves the valve member 312 relatively downstream carrying the seal assembly 354 and the body seal 368 downstream therewith.

The downstream movement will continue until the body seal 368 engages the valve housing 304. Also, the valve body 302 will move downstream therewith until the end face 308 thereon engages the surface 318 of the valve housing 304. The downstream movement of the valve body 302 is possible since the valve body 302 is provided with slotted tab portions similar to the portions 58 and 60 previously described in connection with the embodiment of FIG 1.

Simultaneously, the upstream seal assembly 326 and the seal body 348 will move downstream to maintain the sealing engagement of the O-ring seal 344 with the body seal 348.

From the foregoing, it can be appreciated that the seals described in connection with the embodiment of FIG. 9 are effective to prevent escape of fluid from the valve 300 regardless of the position of the valve member 312 and regardless of whether elongation of the valve housing 304 has occured. It should also be pointed out that the valve 300 may be provided with identical though oppositely disposed seal assemblies that correspond with either the seal assembly 326 or the seal assembly 354.

From the foregoing detailed description of the various embodiments, it can be appreciated that flow control devices constructed utilizing the differential area seals are effective to avoid leakage from the devices even if the pressure therein becomes sufficiently high to elongate the valve housing or to separate the flanged connection members by elongation of the threaded fasteners. Thus, it is possible to reduce the wall thickness of the valve housing and to reduce the diameter of the threaded fasteners and the size of the flanged connection members, thereby reducing the weight and cost of such devices.

It will be understood that the detailed description of the embodiments made hereinbefore are presented by way of example only and that many changes and modifications can be made thereto without departing from the spirit of the invention or from the scope of the annexed claims.

What I claim is:

1. Flow control apparatus including:
    connection means having an opening extending therethrough and a pair of opposed surfaces on said connection means;
    valve body means disposed in said connection means and having a pair of end faces, each end face facing a respective one of the opposed surfaces on said connection means, said body means having a passageway therethrough intersecting said end faces;
    a valve member movably positioned in said body means for opening and closing said passageway; and
    annular seal means slidingly disposed in said connection means adjacent one end face on said body means, said seal means sealingly engaging said connection means and sealingly engaging said body means along a circumference having a diameter smaller than the diameter of sealing engagement with said connection means, whereby fluid pressure in said apparatus holds said seal means in sealing engagement with said body means.

2. The flow control apparatus of claim 1 and also including second annular seal means slidingly disposed in said connection means adjacent the other end face on said body means, said second annular seal means sealingly engaging said connection means and sealingly engaging said body means along a circumference having a diameter smaller than the diameter of sealing engagement with said connection means whereby fluid pressure in said apparatus holds said second annular seal means in sealing engagement with said body means.

3. The flow control apparatus of claim 2 wherein each said annular seal means includes.
   a relatively rigid seal body;
   a first annular seal member carried by said seal body in sliding and sealing engagement with said connection means; and,
   a second annular seal member carried by said body means sealingly engaging said seal body, said second annular seal member having a diameter smaller than the diameter of said first annular seal member.

4. The flow control apparatus of claim 2 wherein each said seal means includes:
   a relatively rigid seal body;
   a first annular seal member carried by said seal body in sliding and sealing engagement with said connection means; and,
   a second annular seal member carried by said seal body in sealing engagement with said body means, said second annular seal member having a diameter smaller than the diameter of said first annular seal member.

5. The control apparatus of claim 4 and also including resilient means disposed in engagement with said seal body and connection means for biasing said seal means toward said body means.

6. The flow control apparatus of claim 1 and also including holding means retaining said body means and connection means in assembled relationship.

7. The flow control apparatus of claim 6 wherein
said connection means also includes a pair of spaced, generally parallel side portions extending alongside said opening;
said body means includes a pair of tab portions overlying said side portions, each tab portion having an aperture extending therethrough; and,
said holding means includes a fastener member extending through each said aperture, and connected with a respective one of said side portions to hold said body means and connection means assembled.

8. The flow control apparatus of claim 6 wherein
said connection means also includes a pair of spaced, flanged connection members; and,
said holding means includes a plurality of fastener members extending through and engaging said connection members exteriorly of said body means to hold said body means and connection means assembled.

9. A valve comprising:
connection means having an opening extending therethrough, a pair of oppsed surfaces on said connection means, and a counterbore in each of said opposed surfaces;
a valve body disposed in said connection means, said valve body having a pair of end faces and a passageway extending therethrough and intersecting said end faces, each end face facing a respective one of the opposed surfaces on said connection means;
a valve member movably disposed in said passageway, said valve member being movable from a position opening said passageway to a position closing said passageway; and,
first annular seal means including
   a relatively rigid seal body slidingly disposed in each of the counterbores in said connection means and,
   a first annular seal member carried by said each seal body in sliding and sealing engagement with said connection means in said counterbores; and,
second annular seal means carried by said valve body, said second annular seal means each sealingly engaging a respective one of said first annular seal means along a circumference having a diameter smaller than the diameter of sealing engagement between said first annular seal members and connection means, whereby each said first annular seal means is biased by fluid pressure toward said valve body to maintain the sealing engagement between said first annular seal means and said second annular seal means.

10. The valve of claim 9 wherein
said connection means also includes a pair of spaced, flanged connection members; and,
said holding means includes a plurality of fastener members extending through and engaging said connection members exteriorly of said valve body to hold said valve body and connection means assembled with said opening and passageway in substantial alignment.

11. The valve of claim 10 wherein said second annular seal means includes:
   a relatively rigid second seal body disposed in said passageway;
   a second annular seal member carried by said second seal body in sealing engagement with said valve body in said passageway and with said first annular seal means; and,
   a third annular seal member carried by said second seal body having a surface thereon arranged to sealingly engage said valve member.

12. The valve of claim 11 wherein said valve member is spherical in configuration and has a flow port extending therethrough, said valve member being rotatable between a position wherein said port is aligned with said passageway and a position wherein said port and passageway are disaligned.

13. The valve of claim 10 wherein said second annular seal means includes:
   a relatively rigid second seal body having an axial flange portion disposed in said passageway and a radial flange portion located between said valve body and said first seal means;
   a second annular seal member disposed in said radial flange portion in sealing engagement with said first annular seal means;
   a third annular seal member carried by said second seal body having a surface thereon arranged to sealingly engage said valve member; and,
   a fourth annular seal member encircling said axial flange portion in sealing engagement with said valve body in said passageway.

14. A valve comprising:
connection means having an opening extending therethrough, a pair of opposed surfaces on said connection means, and a counterbore in each of said opposed surfaces;
a valve body disposed in said connection means, said valve body having a pair of end faces and a passageway extending therethrough and intersecting said end faces, each end face facing a respective one of the opposed surfaces on said connection means;
a valve member movably disposed in said passageway, said valve member being movable from a position opening said passageway to a position closing said passageway; and,
annular seal means including
   a relatively rigid seal body slidingly disposed in each of said counterbores,
   a first annular seal member carried by each said seal body in sliding and sealing engagement with said connection means in said counterbores, and a second annular seal member carried by each said seal body in sealing engagement with the end faces on said valve body along a circumference having a diameter smaller than the diameter of sealing engagement of said first annular seal member with said connection means, whereby fluid pressure biases said seal means toward said valve body to maintain said second annular seal member in sealing engagement with said valve body.

15. The valve of claim 14 wherein
said connection means also includes a pair of spaced, generally parallel side portions extending alongside said opening;
said valve body includes a pair of tab portions overlying said side portions, each tab portion having an aperture extending therethrough; and,
said valve also includes a fastener member extending through each said aperture and connected with said respective side portion to hold said valve body and connection means assembled with said passageway and opening in substantial alignment.

16. The valve of claim 14 wherein
said valve body has an annular valve seating surface encircling a portion of said passageway and has a perforated spider portion therein including a centrally located aperture;
said valve member includes a head portion engageable with said seating surface to close said passageway and a stem portion slidingly disposed in said centrally located aperture; and,
said valve also includes resilient means engaging said valve member and spider portion to bias the head portion and said valve member toward said annular seating surface.

References Cited

UNITED STATES PATENTS

| | | | |
|---|---|---|---|
| 3,146,792 | 9/1964 | Donnelly et al. | 251—315 X |
| 3,323,542 | 6/1967 | Magos et al. | 251—315 X |
| 3,373,967 | 3/1968 | Scaramucci | 251—315 X |
| 1,785,271 | 12/1930 | Lemex | 137—542 X |
| 2,729,238 | 1/1956 | Hite | 137—542 X |
| 3,095,898 | 7/1963 | Freeman et al. | 137—454.2 |
| 3,154,094 | 10/1964 | Bredtschneider et al. | 251—174 X |
| 3,171,429 | 3/1965 | Sturmer et al. | 251—170 X |
| 3,173,647 | 3/1965 | Bryant | 251—174 X |

WILLIAM F. O'DEA, *Primary Examiner.*

D. H. LAMBERT, *Assistant Examiner.*

U.S. Cl. X.R.

251—172, 192, 315; 137—454.2